Figure 1:
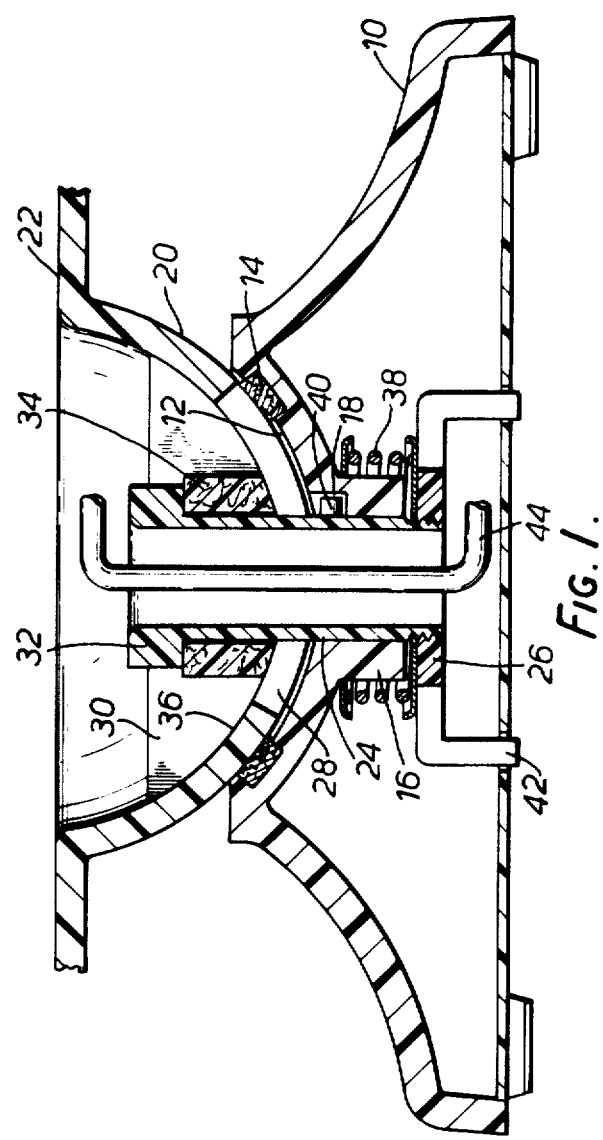

United States Patent [19]

Prince et al.

[11] Patent Number: 4,549,710
[45] Date of Patent: Oct. 29, 1985

[54] SUPPORTING ASSEMBLY

[75] Inventors: Dennis Prince, Long Eaton; Eric C. Douglas, Broadstone, both of England

[73] Assignee: Plessey Overseas Limited, Ilford, England

[21] Appl. No.: 469,121

[22] Filed: Feb. 23, 1983

[30] Foreign Application Priority Data

Feb. 26, 1982 [GB] United Kingdom ............... 8205796

[51] Int. Cl.[4] .......................................... F16M 11/12
[52] U.S. Cl. ................................. 248/183; 248/349; 248/349
[58] Field of Search ............... 248/183, 184, 185, 349, 248/346, 178, 179, 139, 141, 299; 297/313, 314, 349; 108/1, 139, 140; 403/123, 125, 144

[56] References Cited

U.S. PATENT DOCUMENTS

| 684,451 | 10/1901 | Mowry | 248/346 |
|---|---|---|---|
| 1,065,060 | 6/1913 | Leyner | 248/346 |
| 1,139,823 | 5/1915 | Thomas | 248/299 |
| 1,703,099 | 2/1929 | Craddock | 248/299 |
| 2,588,252 | 3/1952 | Lampe | 403/125 |
| 2,893,674 | 7/1959 | Monaco | |
| 3,210,106 | 10/1965 | Templeton | 403/125 |
| 3,300,165 | 1/1967 | O'Kane | 248/179 |
| 4,304,385 | 12/1981 | Farouche | 248/183 |

FOREIGN PATENT DOCUMENTS

| 1052127 | 3/1959 | Fed. Rep. of Germany | 248/346 |
|---|---|---|---|
| 1904215 | 8/1970 | Fed. Rep. of Germany | 297/349 |
| WO80/00169-13 | 1/1980 | PCT Int'l Appl. | 248/349 |

Primary Examiner—J. Franklin Foss
Assistant Examiner—Robert A. Olson
Attorney, Agent, or Firm—Fleit, Jacobson, Cohn & Price

[57] ABSTRACT

A supporting assembly includes a base member having a spherical depression and a supporting platform having a hemispherical projection. The projection is mounted in the depression and a pillar projects through the two members, the pillar being rotatable in the base member and extending through a slot in the hemispherical projection. The top of the pillar is square in section and co-operates with a channel of similar width formed in the hemispherical projection having the same axis as the slot. The arrangement permits a VDU to pivot in one plane only relative to the pillar (so that the edge of the screen remains parallel to a desk top) and to swivel on the base member.

6 Claims, 2 Drawing Figures

SUPPORTING ASSEMBLY

This invention relates to supporting assemblies and more particularly relates to a supporting assembly for a component which enables the component both to rotate and to tilt relative to the base of the supporting assembly. An example of such a component is a visual display unit which may require to be tilted and rotated on a supporting stand to enable it to be more easily used.

It is an object of the present invention therefore to provide a supporting assembly which will enable a component to be so moved relative to the base of the supporting assembly.

According to an aspect of the present invention a supporting assembly comprises a base member having a depression with a spherical surface and a supporting member having a projecting portion with a spherical surface adapted to fit inside the depression in the base member and to move therein, restraining means being provided to a supporting assembly comprising a base member and a supporting member, the base member having a depression with a spherical surface and the supporting member having a projection with a spherical surface adapted to fit inside the depression in the base member and to move therein, restraining means being provided to restrict the movement of the supporting member to rotate about a first axis extending perpendicularly from the base of the base member and to pivot on a second axis, the second axis being perpendicular to and rotatable about the first axis and friction means acting on the spherical surface such that the projection is retained in any selected position in the depression in the base member.

Figure 2:
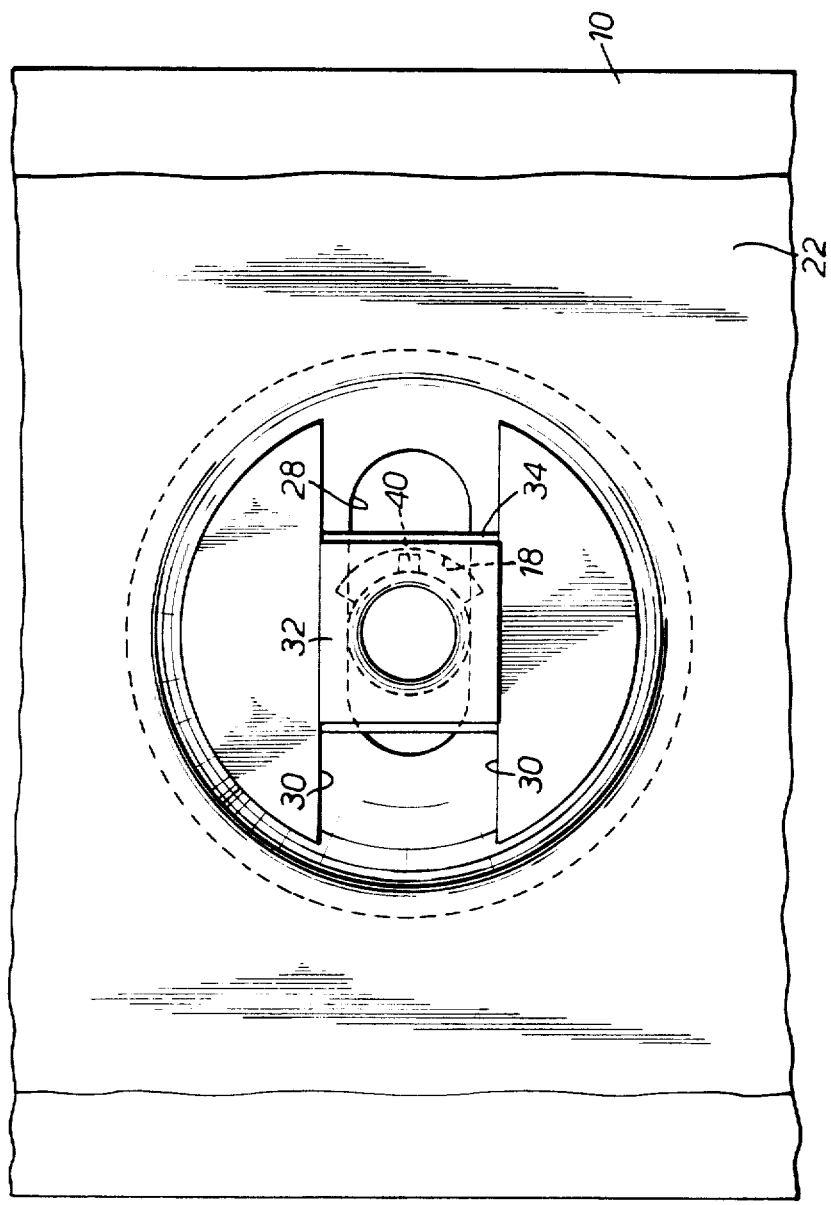

An embodiment of the invention will now be described by way of example only from which further aspects of the invention will become apparent, with reference to the accompanying drawings in which:

FIG. 1 is a cross-sectional view of a supporting assembly constructed in accordance with the invention and, FIG. 2 is a plan view of the supporting assembly.

The supporting assembly illustrated is adapted to support a visual display unit (VDU) (not shown) and permit it to be both pivotable and tiltable on a base.

The supporting assembly comprises a base 10 the upper surface on which has a depression 12 having a spherical surface. Located in a groove encircling the depression 12 is a felt ring 14 and a hole is provided through a boss 16 formed in the centre of the depression. An additional groove 18 is provided in the boss 16 which extends a portion of the way around the central hole.

Seated in the depression 12 is a substantially hemispherical projection 20 having a similar radius to the depression 12, the projection 20 forming part of a supporting member 22.

The projection 20 and the depression 12 are held together by a pillar 24, the lower portion of the pillar passing through the hole through the boss 16 and being rotatable therein. A nut 26 is secured to the pillar 24 below the boss 16. The pillar passes through a transverse elongated slot 28 formed in the projection 20 and between two parallel walls 30 which are also parallel to the axis of the slot 28. The upper end 32 of the pillar 24 is of square section which is a close fit between the walls 30 and thus relative rotation is prevented between the projection 20 and the pillar 24. A synthetic resin bonded fabric block 34 is clamped around the pillar 24 between the upper end 32 and the internal surface 36 of the projection 20.

The supporting member 20 can thus rotate on the base 10 and can pivot about the centre of radius of the projection 20 in the plane containing the axis of the slot 28, i.e. in one plane relative to the pillar 24. The block 34 acts as a friction member against the surface 36 and the walls 30, and the dry, unlubricated felt ring 14 acts as a friction member against the outer surface of the projection 20 to restrict the rate of movement of the projection 20 when the supporting member is pivoted. The tension between the block 34 and the surface 36 can be adjusted by adjusting the nut 26 which acts against a helical spring 38 between the nut 26 and the underside of the depression 12. The nut 26 is rotated by arms 42 which project downwardly from the nut 26.

This tension is adjusted depending on the weight of the article to be supported by the supporting member 22. Once this tension is correctly set, the article can readily be moved to various different positions relative to the base 10, and the friction in the supporting assembly is sufficient to hold the article securely in a selected position.

The angle of rotation of the supporting member 22 on the base 10 is restricted by a pin 40 mounted in the pillar 24 and adapted to rotate in the groove 18.

The supporting assembly is particularly suitable for supporting a visual display unit (VDU) to facilitate its use. In this case the VDU is mounted with the screen arranged transversely to the axis of the slot 28 so that the screen of the VDU can only be pivoted up and down and the VDU can be rotated. The power supply cable 44 for the VDU can pass through the hollow pillar 24.

We claim:

1. A supporting assembly comprising:
    a base member and a supporting member, said base member having a spherically shaped depression formed therein, said supporting member having a sphericaly shaped projection with substantially the same radius of curvature as said depression, said projection being mounted inside said depression and defining an elongated slot,
    a pillar extending through said slot and radially through said depression and being rotatable relative thereto,
    means coupling said projection and said pillar for rotation together,
    first and second friction members, each comprising a dry fibrous material,
    said first friction member being mounted between said depression and said projection and acting on the outer surface of said projection to allow motion of said projection relative to said depression and to maintain said projection in repose in a set position relative to said depression,
    said second friction member being mounted on said pillar and pressing on the internal surface of said projection to allow motion of said pillar relative to said projection and to maintain said pillar in repose in a set position relative to said projection, so that said supporting member is tiltable in the plane containing the axis of said elongated slot against said first friction member and said second friction member and is rotatable relative to said base member about the axis of the pillar, and spring means biasing the pillar relative to the projection and the depression to cause the first friction member to press against said outer surface of said projection and the second friction member to press against said internal surface of said projection to apply a preset degree of friction thereto.

2. A supporting assembly as claimed in claim 1, wherein said means urging said first friction member against said outer surface of said projection and said second friction member against said internal surface of said projection comprises spring means mounted on said pillar having a preset degree of tension.

3. A supporting assembly as claimed in claim 2, wherein the preset degree of tension of said spring means is adjustable by means of a nut threadedly mounted on said pillar.

4. A supporting assembly as claimed in claim 1, wherein the end of the pillar is provided with parallel sides which are engaged by parallel wall members formed inside the projection.

5. A supporting assembly as claimed in claim 4 wherein said second friction member is located between the end of the pillar and the internal surface of the projection.

6. A supporting assembly as claimed in claim 5 wherein said second friction member is located between the pillar and the parallel wall members.

* * * * *